US009210720B2

(12) United States Patent
Abraham et al.

(10) Patent No.: US 9,210,720 B2
(45) Date of Patent: Dec. 8, 2015

(54) SYSTEMS AND METHODS FOR ACCESS POINT TRIGGERED TRANSMISSIONS AFTER TRAFFIC INDICATION MAP PAGING

(71) Applicant: QUALCOMM Incorporated, San Diego, CA (US)

(72) Inventors: Santosh Paul Abraham, San Diego, CA (US); Alfred Asterjadhi, Breukelen (NL); Maarten Menzo Wentink, San Diego, CA (US); Simone Merlin, San Diego, CA (US); Zhi Quan, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 13/720,343

(22) Filed: Dec. 19, 2012

(65) Prior Publication Data

US 2013/0208637 A1   Aug. 15, 2013

Related U.S. Application Data

(60) Provisional application No. 61/597,947, filed on Feb. 13, 2012.

(51) Int. Cl.
| | | |
|---|---|---|
| *H04W 4/00* | (2009.01) | |
| *H04W 74/06* | (2009.01) | |
| *H04W 72/12* | (2009.01) | |
| *H04L 12/403* | (2006.01) | |
| *H04W 74/04* | (2009.01) | |
| *H04W 52/02* | (2009.01) | |

(52) U.S. Cl.
CPC ............ *H04W 74/06* (2013.01); *H04L 12/403* (2013.01); *H04W 72/121* (2013.01); *H04W 72/1289* (2013.01); *H04W 74/04* (2013.01); *H04W 52/02* (2013.01)

(58) Field of Classification Search
None
See application file for complete search history.

(56) References Cited

U.S. PATENT DOCUMENTS

| 7,881,755 | B1 | 2/2011 | Mishra et al. | |
|---|---|---|---|---|
| 2002/0105970 | A1* | 8/2002 | Shvodian | 370/468 |
| 2004/0071246 | A1* | 4/2004 | Diepstraten et al. | 375/354 |

(Continued)

FOREIGN PATENT DOCUMENTS

| EP | 2160061 A2 | 3/2010 |
|---|---|---|
| WO | 2012096549 A2 | 7/2012 |

OTHER PUBLICATIONS

International Search Report and Written Opinion—PCT/US2013/025960—ISA/EPO—Jun. 18, 2013.

(Continued)

*Primary Examiner* — Otis L Thompson, Jr.
(74) *Attorney, Agent, or Firm* — James K. O'Hare

(57) ABSTRACT

Systems, methods, and devices for reducing collisions in a wireless communications network are described herein. In one aspect an apparatus for wireless communication is provided. The apparatus includes a transmitter configured to transmit a first message over a communication medium to a plurality of nodes configured to be selectively at least partially powered down during time periods in which the first message is not expected to be transmitted. The first message indicates a subset of the plurality of nodes for which data is available for transmission. The apparatus further includes a controller configured to initiate a process for transmitting the data available to the subset of the plurality of nodes after the first message is transmitted.

25 Claims, 12 Drawing Sheets

(56) References Cited

U.S. PATENT DOCUMENTS

| | | |
|---|---|---|
| 2004/0240422 A1* | 12/2004 | Kim .............................. 370/348 |
| 2004/0253996 A1 | 12/2004 | Chen et al. |
| 2005/0009565 A1* | 1/2005 | Kwak ........................... 455/561 |
| 2005/0037802 A1* | 2/2005 | Nakajima et al. ........... 455/550.1 |
| 2005/0117530 A1* | 6/2005 | Abraham et al. .............. 370/310 |
| 2005/0141545 A1* | 6/2005 | Fein et al. ..................... 370/445 |
| 2005/0185666 A1* | 8/2005 | Raya et al. .................... 370/461 |
| 2006/0002349 A1* | 1/2006 | Demirhan ..................... 370/338 |
| 2006/0165031 A1* | 7/2006 | Wang et al. ................... 370/328 |
| 2008/0113640 A1* | 5/2008 | Bennett ......................... 455/303 |
| 2008/0182596 A1 | 7/2008 | Wang et al. |
| 2008/0192689 A1* | 8/2008 | Kim et al. ..................... 370/329 |
| 2008/0225811 A1* | 9/2008 | Wentink ........................ 370/338 |
| 2010/0067505 A1* | 3/2010 | Fein et al. ..................... 370/338 |
| 2010/0290378 A1* | 11/2010 | Wu et al. ....................... 370/311 |
| 2011/0249605 A1 | 10/2011 | Kwon et al. |
| 2011/0286375 A1 | 11/2011 | Chu et al. |
| 2012/0026931 A1* | 2/2012 | Wentink ........................ 370/312 |
| 2012/0176949 A1 | 7/2012 | Meylan et al. |
| 2013/0077554 A1* | 3/2013 | Gauvreau et al. ............. 370/312 |
| 2014/0169290 A1* | 6/2014 | Seok .............................. 370/329 |

OTHER PUBLICATIONS

Tseng Y C., "Power Management in IEEE 802.11", Sep. 8, 2012, pp. 1-49, XP002697259, Retrieved from the Internet: URL:http://www.doostoc.com/docs/126428103/Power-Management-in-80211 [retrieved on May 17, 2013] pp. 22,23.

\* cited by examiner

SYSTEMS AND METHODS FOR ACCESS POINT TRIGGERED TRANSMISSIONS AFTER TRAFFIC INDICATION MAP PAGING

CLAIM OF PRIORITY UNDER 35 U.S.C. §119

The present application for patent claims priority to Provisional Application No. 61/597,947 entitled "SYSTEMS AND METHODS FOR ACCESS POINT TRIGGERED TRANSMISSIONS AFTER TRAFFIC INDICATION MAP PAGING" filed Feb. 13, 2012, and assigned to the assignee hereof and hereby expressly incorporated by reference herein.

BACKGROUND

1. Field

The present application relates generally to wireless communications, and more specifically to systems, methods, and devices for performing uplink transmissions for nodes operating in a power saving mode.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a doze state to conserve power, where the devices do not actively transmit/receive information in the doze state. These devices may further utilize paging messages to determine when to wake up from a doze state and enter an awake state in order to transmit/receive data. Thus, improved systems, methods, and devices for managing uplink transmissions after a paging message are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides an apparatus for wireless communication, the apparatus comprising a transmitter configured to transmit a first message over a communication medium to a plurality of nodes, wherein the first message indicates a subset of the plurality of nodes for which data is available for transmission, the first message further indicating a time at which data will be transmitted to nodes of the subset of the plurality of nodes; and a controller configured to initiate a process for transmitting the data available to the subset of the plurality of nodes after the first message is transmitted.

In one aspect, a method for wireless communication is disclosed, the method comprising transmitting a first message over a communication medium to a plurality of nodes, wherein the first message indicates a subset of the plurality of nodes for which data is available for transmission, the first message further indicating a time at which data will be transmitted to nodes of the subset of the plurality of nodes; and initiating a process for transmitting the data available to the subset of the plurality of nodes after the first message is transmitted.

In one aspect, an apparatus for wireless communication is disclosed, the apparatus comprising means for transmitting a first message over a communication medium to a plurality of nodes, wherein the first message indicates a subset of the plurality of nodes for which data is available for transmission, the first message further indicating a time at which data will be transmitted to nodes of the subset of the plurality of nodes; and means for initiating a process for transmitting the data available to the subset of the plurality of nodes after the first message is transmitted.

In one aspect, a computer program product is disclosed, comprising computer readable medium comprising code for transmitting a first message over a communication medium to a plurality of nodes, wherein the first message indicates a subset of the plurality of nodes for which data is available for transmission, the first message further indicating a time at which data will be transmitted to nodes of the subset of the plurality of nodes; and code for initiating a process for transmitting the data available to the subset of the plurality of nodes after the first message is transmitted.

In one aspect, an apparatus for wireless communication is disclosed, the apparatus comprising a receiver configured to receive a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes; and receive data according to a process for transmitting the data available to the subset of the plurality of nodes, the process being initiated by a node transmitting the first message after transmitting the first message.

In one aspect, a method for wireless communication is disclosed, the method comprising receiving a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes; and receiving data according to a process for transmitting the data available to the subset of the plurality of nodes, the process being initiated by a node transmitting the first message after transmitting the first message.

In one aspect, an apparatus for wireless communication is disclosed, the apparatus comprising means for receiving a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes; and means for receiving data according to a process for transmitting the data available to the subset of the plurality of nodes, the process being initiated by a node transmitting the first message after transmitting the first message.

In one aspect, a computer program product is disclosed, comprising computer readable medium comprising code for receiving a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes; and code for receiving data according to a process for transmitting the data available to the subset of the plurality of nodes, the process being initiated by a node transmitting the first message after transmitting the first message.

DETAILED DESCRIPTION

Figure 1:
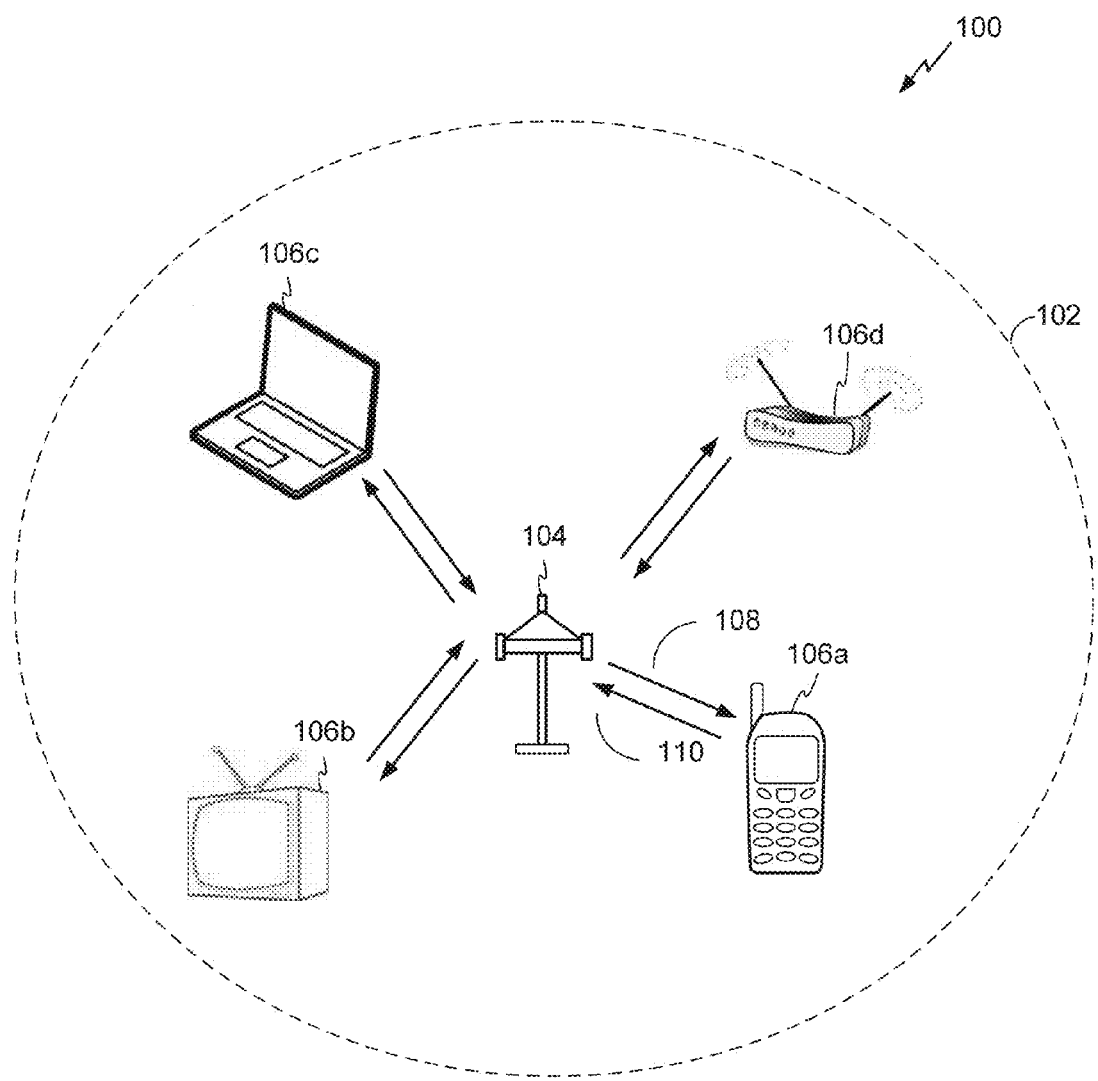
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP. A STA or an AP may be referred to as a node in a wireless communications network.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g., shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
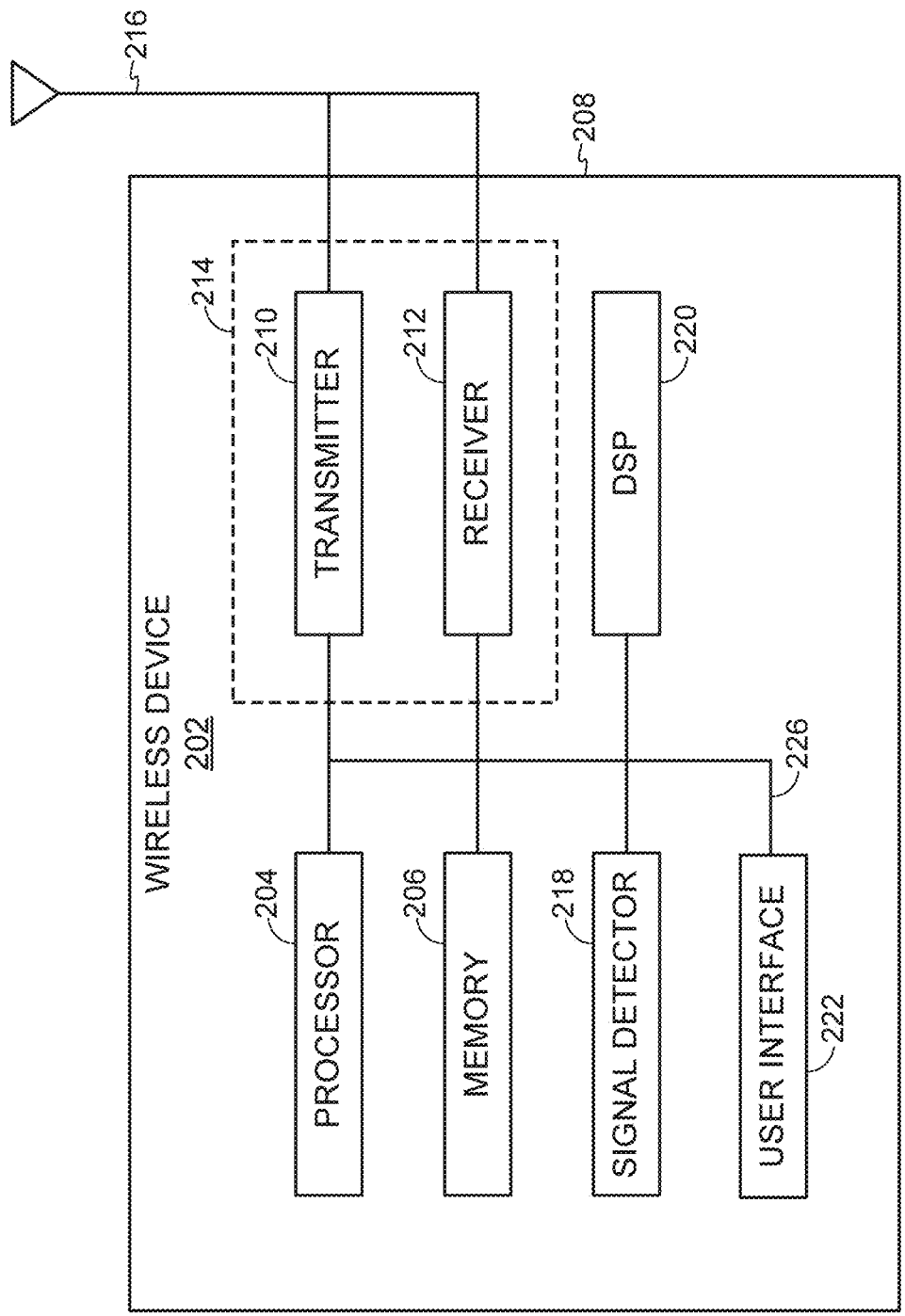
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 200 may be configured to operate in a low power or "doze" state where the wireless device 200 does not actively transmit/receive information. For example a portion or all of the transceiver 214 may be at least partially powered down.

The transmitter 210 may be configured to wirelessly transmit messages, which may be referred to as "paging messages" that are configured to indicate to other wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages.

The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including paging messages. That is, either AP 104 or STA 106 may serve as transmitter or receiver devices of paging messages. Certain aspects contemplate signal detector 218 being used by software running on memory 206 and processor 204 to detect the presence of a transmitter or receiver.

The STA 106 may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. The STA 106 may at least partially power down a portion of a transceiver in the doze state. Further, in the power save mode, the STA 106 may occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 may transmit paging messages to a plurality of STAs 106 in a power save mode in the same network as the AP 104, indicating whether or not there is data buffered at the AP 104 for the STAs 106. The STAs 106 may also use this information to determine whether they need to be in an awake state or a doze state. For example, if an STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, paging messages may comprise a bitmap (not shown in this figure), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state). Accordingly, the size of the bitmap may be directly proportional to the number of STAs 106 in the wireless communications system 100. Therefore, a large number of STAs 106 in the wireless communications system 100 may result in a large bitmap.

Figure 3:
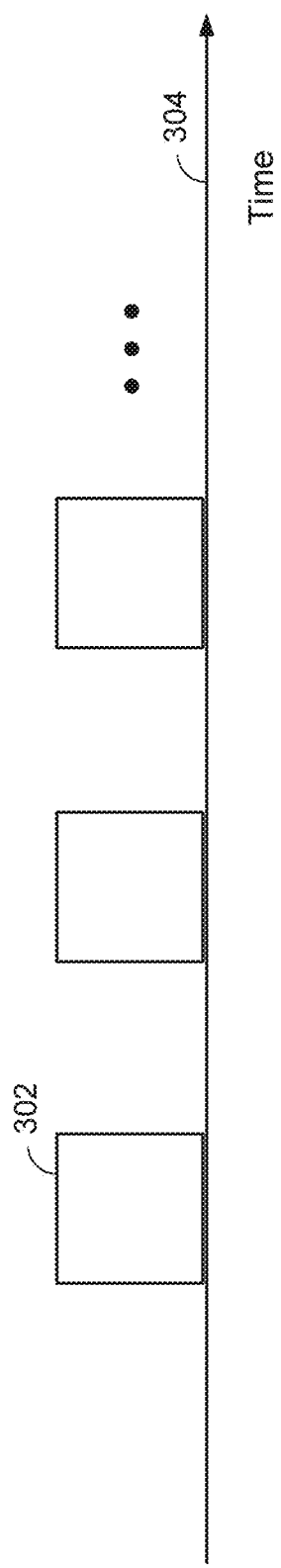
FIG. 3 illustrates a plurality of partitioned paging messages transmitted by an access point to wireless stations in the wireless communication system of FIG. 1.

FIG. 3 illustrates a plurality of partitioned paging messages 302 transmitted by the AP 104 to STAs 106 in the wireless communication system 100 of FIG. 1. As shown, time increases horizontally across the page over the time axis 304. As shown, the AP 104 is configured to transmit a plurality of paging messages 302. The paging messages 302 may be sent in a TIM frame, a beacon, or using some other appropriate signaling. The STAs 106 may be configured to listen to one or more of the paging messages 302. Following the one or more paging messages 302, the STAs 106 may be configured to transmit requests to the AP 104 and receive a response from the AP 104.

The paging process may result in a high number of STAs 106 receiving the one or more paging messages 302. For example, a high number of STAs 106 in the same TIM may receive the one or more paging messages 302, which may lead to one or more STAs 106 contending to transmit requests to the AP 104 on the medium after the TIM. Accordingly, collisions resulting in corrupted data received by the AP 104 may occur in situations in which at least two STAs 106 attempt to transmit requests to the AP 104 at or nearly at a same time.

Figure 4:
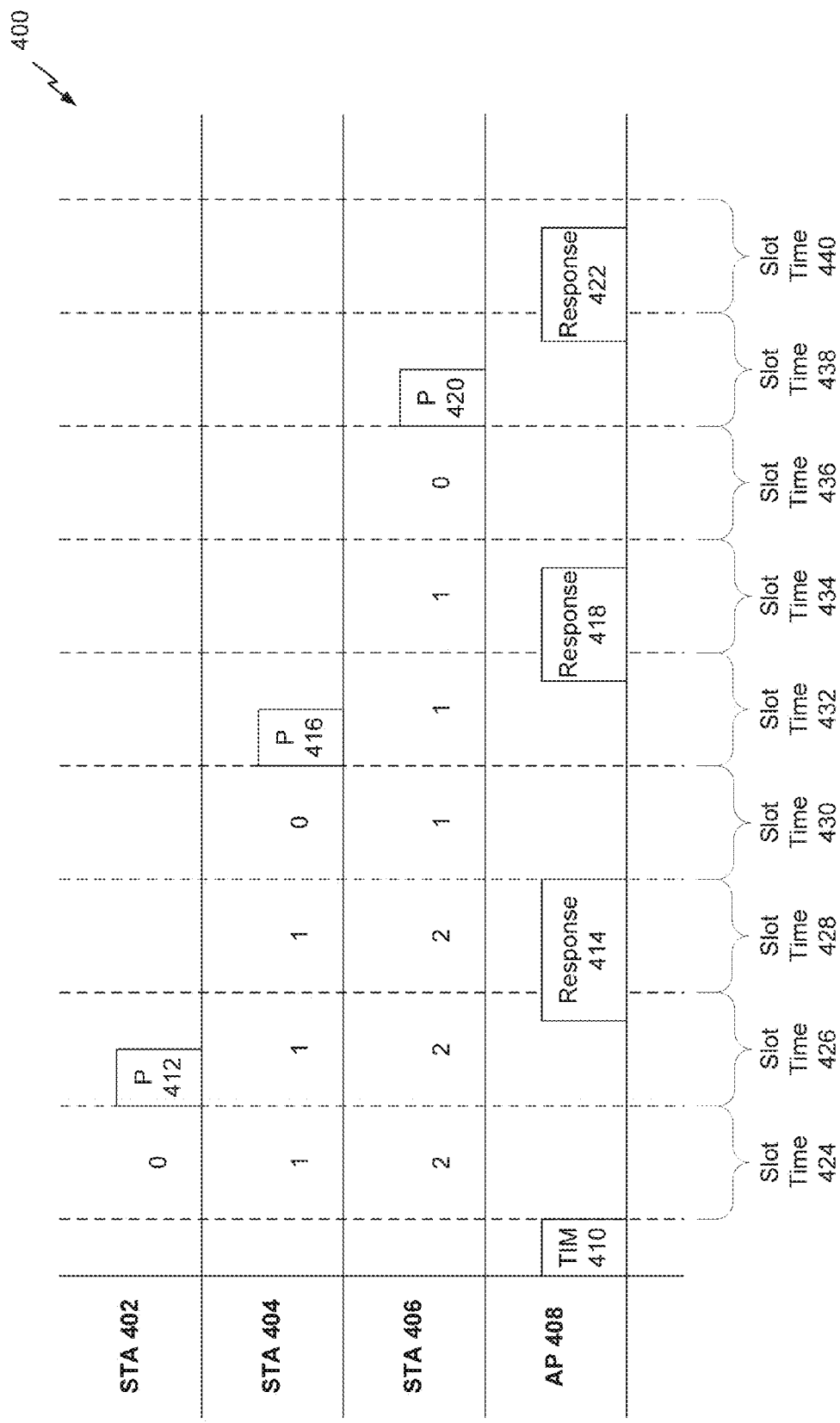
FIG. 4 illustrates an exemplary polling request mechanism.

FIG. 4 illustrates a polling request mechanism 400. The polling request mechanism 400 shown may be used by the AP 104 and the STAs 106 in the wireless communication system 100 of FIG. 1. As shown, time increases horizontally across the page from slot time 424 to slot time 440. The implementation shown by FIG. 4 shows a contention based system, where different STAs may contend to gain access to the medium. In contrast, FIGS. 5-8 as will be further described below show alternative implementations which may have improvements in various aspects over the implementation of FIG. 4 as will be further described below.

In general, after the transmission of a paging message, such as TIM 410, a time interval may be reserved for the paged STAs 106. The reservation may be achieved by transmitting a message (e.g., paging message, additional message) to cause non-paged STAs to defer access to the medium for the duration of the reserved period. In some implementations, the deferred access can be achieved by setting a duration field value of a reserving frame so that non-paged STAs can set their network allocation vector (NAV). In other implementations, the deferred access can be achieved by sending an additional frame preceding or following the paging frame, where the additional frame indicates the duration of the reserved period.

During the reserved time interval, the paged STAs 106 can send requests to the AP 104 (e.g., Power Saving polls (PS-POLL) requests 412, 416, and 420) and receive a response from the AP 104 (e.g., response 414, 418, and 422). Multiple paged STAs 106 can contend during the reserved time interval in accordance with various methods, as described herein. In some embodiments, STAs 106 that have not been paged cannot contend during the reserved time interval. Once the reserved time interval is over, STAs 106 can start contending to send the requests to the AP 104. In an embodiment, the AP 104 may determine the duration of the reserved time interval. The reserved time interval should be sufficient for all the paged STAs 106 to send requests to the AP 104 and receive a response from the AP 104. By way of example, and not limitation, the duration of the reserved time interval may be a function of the number of paged STAs 106.

The polling request mechanism 400 illustrates an embodiment in which STAs 402, 404, and 406 can transmit requests, like PS-POLLs 412, 416, and 420, to AP 408 in such a way so as to avoid collisions. STAs 402, 404, and 406 may be similar to STAs 106 as described herein. In some embodiments, the STAs 402, 404, and 406 may transmit requests to the AP 408 in a certain order. AP 408 may be similar to AP 104 as described herein. The paging message, such as TIM 410, may implicitly or explicitly define an ordering for the STAs 402, 404, and 406. For example if the TIM 410 bitmap indicates that both STA 402 and STA 404 are paged, then the TIM 410 bitmap also implicitly or explicitly indicates whether STA 402 is before or after STA 404. In an example, the order could be determined by the order in which the paged STAs appear in the bitmap representation. Consider a bitmap {0, 1, 0, 0, 1, 1}, where the STA associated with the bit in position 2 is assumed to be before the STA associated with the bit in position 5. In some implementations, the compressed bitmap may be expressed as list of STA identifiers. In this case the sequence in which the STA identifiers appear in the list may determine the order. Consider the list {13, 25, 5, 22}, where the STA associated with identifier "13" is assumed to come before STA identified by "5." In another aspect, the order may be derived from the value of the STA identifier irrespective of the message representation.

In some implementations, the position of the STA 402, 404, or 406 within the TIM 410 bitmap sequence may be a function of the position of the STA 402, 404, or 406 as described above. The order may further be dependent on other indications, the indications being either included in the paging message or assumed to be known at the STAs 402, 404, and/or 406. For example, the indication may include the Timing Synchronization Function (TSF) within the paging message (e.g., TIM 410). In such an implementation, the first STA may be the one whose identifier is set to "1" and has a position within the TIM 410 bitmap sequence which is first in the order after the position associated with the 12 least significant bits (LSBs) of the TSF. Many other functions incorporating various indications can be included to achieve a similar result as that based on the TSF. One beneficial result of including the TSF in the computation of the order is that the order may be changed at each transmission, provided that the portion of the used TSF is different at each transmission.

In some implementations, the sender of the paging message may determine the order of the paged STAs according to any criteria including the usage of the ordering information. For example the sender, AP 408, may order the STAs 402, 404, and 406 based on their QoS requirements, power saving requirements, or other performance parameters. It may be desirable in some implementation for the sender of the paging message to include in the message an explicit indication of the order. This explicit indication of the order may not be based on the TIM 410 bitmap, but rather on other factors as described herein.

For illustrative purposes only, and not meant to be limiting, FIG. 4 depicts an order of STA 402, STA 404, and then STA 406. While STA 402 may be the first STA to transmit a request to the AP 408, the STA 402 may not do so immediately after the TIM 410. Each of STAs 402, 404, and 406 may be configured to use a carrier sense multiple access with collision avoidance (CSMA/CA) based medium access procedure, such as the distributed coordination function (DCF) or the enhanced distributed channel access (EDCA) as defined in the IEEE 802.11 standard. In such a medium access mechanism, a STA 402, 404, or 406 that wants to access the medium for the transmission of a frame initializes a back-off counter. The back-off counter may be initialized with a random number chosen in an appropriate interval. For example, an appropriate interval may be a value between 0 and a duration of a contention window (CW). The back-off counter may be decremented while the transmission medium (e.g., channel) is idle—in other words, no activity is detected on the transmission medium. The transmission medium may be considered to be idle if no activity is detected for a distributed inter-frame space (DIFS) or an arbitration inter-frame space (AIFS) interval. After the medium has been idle for a DIFS or AIFS interval of time, the back-off counter may be decremented by one unit per each additional consecutive idle interval of a duration equal to a slot time. When activity is detected on the medium, the back-off countdown may be frozen and restarted when the medium becomes idle again, as described herein.

The STAs 402, 404, and 406 may transmit a packet on the medium when the back-off counter reaches zero or any other integer that represents a lowest value of the counter. The DIFS interval may be defined as $$\text{DIFS} = \text{SIFS} + (2 \ast \text{slot time}) \quad (1)$$

where SIFS is a short inter-frame space. The AIFS interval may be defined as $$\text{AIFS} = \text{SIFS} + (n \ast \text{slot time}) \quad (2)$$

where n is greater than or equal to 2.

Each of STAs 402, 404, and 406 may be configured to use a deterministic back-off value to initialize a back-off counter, where an initial value of the back-off counter may be based on the order of the paged STAs 402, 404, and 406. For example, an initial value of the back-off counter for STA 402 may be 1, an initial value of the back-off counter for STA 404 may be 2, and an initial value of the back-off counter for STA 406 may be 3. In this way, an initial value of the back-off counter may be different for each STA 402, 404, and 406 so as to allow each STA 402, 404, and 406 to access the medium in different time instants.

In some implementations, the back-off counter for each STA 402, 404, and 406 may decrement the back-off value when the channel over which the STAs 402, 404, and 406 communicate with the AP 408 is idle for the duration of a slot time 424, 426, 428, 430, 432, 434, 436, 438, and 440. As an example, a regular slot time may be a slot time defined in the IEEE 802.11 standard or a similar CSMA/CA protocol. The STAs 402, 404, and/or 406 may be configured to transmit a PS-POLL request 412, 416, and/or 420 when their respective back-off value reaches zero or any other integer that represents a lowest value of the counter.

In the implementation described in FIG. 4, each STA 402, 404, and 406 is configured to send polling messages to the AP 408 in order to request the data that is buffered for the STA 402, 404, and 406. In some instances, this may create extra overhead and have other undesirable effects. It may be desirable to have an improved way for multiple STAs to be able to access the medium in a reliable way after receiving a paging message such as a TIM frame. For example, it may be important to reduce power consumption, reduce medium occupancy, and minimize the time each paged STA 402, 404, and 406 is an awake state. In addition, an implementation for providing access to a medium may also need to take into account a hidden node. A hidden node may be a node that is in communication with an AP 408, but which is hidden from other STAs (i.e., the other STAs are not aware of the existence of the hidden node). In this case, problems may arise for collision avoidance techniques that depend on a STAs ability to sense the medium. In this case it is desirable for a mechanism to reduce/eliminate collisions while also minimizing access delay to the channel. Furthermore, an access scheme after a TIM page may also be robust to handle, for example, adjacent overlapping basic service set (OBSS) transmissions. An OBSS transmission 516 may occur if a STA, such as STA 404, identifies with two or more basic service sets, where each basic service set include an AP and associated STAs. The OBSS transmission may originate from an AP other than AP 408.

As such, according to one implementation, an AP 408 may initiate a process for transmitting the data available to paged STAs 402, 404, and 406 after a paging message is received. For example, an AP 408 may reserve a communication medium exclusively for pages STAs after a TIM page 410 for a certain time interval that may be known or indicated in the TIM page 410 frame. The AP 408 may be configured to estimate the duration for the exclusive time interval based on the number of buffered units (and their associated length) it has planned to sent to the various paged STAs during the time interval. All STAs for which the AP 408 has no data buffered as indicated in received the TIM page 410 may set their NAV for the specified duration. STAs 402, 404, and 406 that are paged (i.e., the TIM page indicates that the AP 408 has data buffered for sending to the STAs 402, 404, and 406) may enter an "awake" mode and be configured to listen for control messages from the AP 408. As will be described in further detail below, the AP 408 may send a first control message indicating that it is planning to send data to a particular paged STA 402. For example, the control message may function similarly to a request to send (RTS) message indicating the particular paged STA 402 to which it plans to transmit buffered data. The paged STA 402 may respond with a second control message indicating that it is ready to receive the buffered data. For example, the second control message may function similarly to a clear to send (CTS) message indicating that it is ready to receive the buffered data. Other paged STAs 404 and 406 may sleep for a time period indicated in the first control message. This process may repeat for all paged STAs. Paged STAs that do not receive their intended first control message (e.g., they were somehow still asleep or receiving some other conflicting message such as an OBSSS transmission) may thereafter solicit the AP 408 by sending a polling message such as a PS-POLL frame during a reserved or a non-reserved time period. This may happen after the time period after the AP 408 has indicated that it will send data transmissions to each of the STAs.

Figure 5:
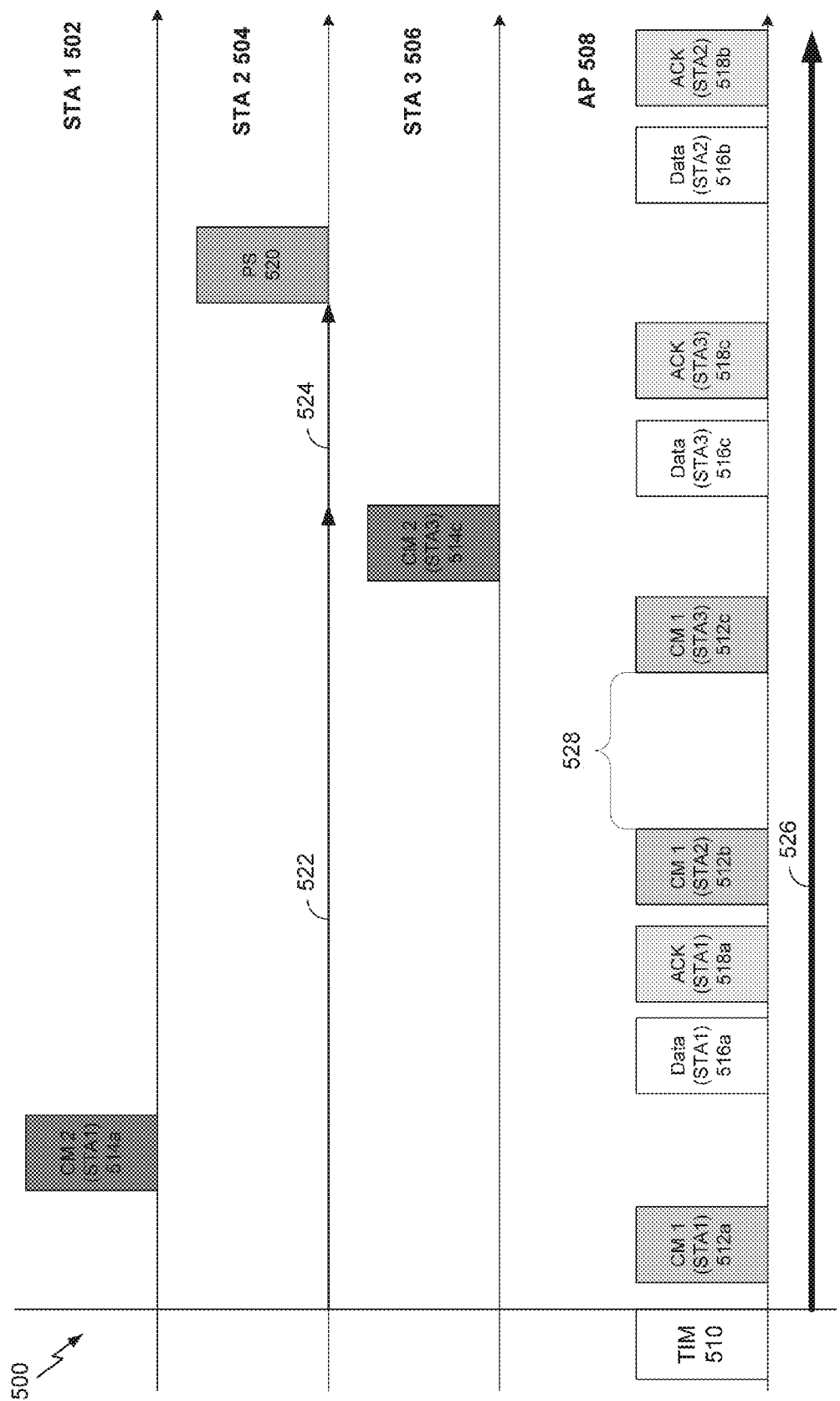
FIG. 5 illustrates an exemplary implementation for access point initiated transmissions after a traffic map indicator page.

FIG. 5 illustrates an exemplary implementation for AP 508 initiated transmissions after a TIM page 510. The TIM page 510 may be referred to as a first message. The AP 508 may be configured to send a TIM page 510 to all STAs (i.e., nodes) within a wireless communication network. For example the TIM page 510 may be sent to all STAs as defined by a basic service set. The transmission of a TIM page 510 may happen periodically during a scheduled time interval. In some embodiments, the STAs within the network may be configured to enter a doze state when they do not expect to receive data. These STAs within the network may be configured to awaken from a doze state during the scheduled time interval to receive the TIM page 510, and otherwise return to the doze state unless the TIM page 510 indicates that data is buffered for that STA. After the TIM page 510 is transmitted, the AP 508 may be configured to initiate a process to communicate data available to each of the paged STAs. For example, the AP 508 may be configured to reserve a period of duration 526 for transmission of buffered data units to paged STAs 502, 504, and 506. This period of time 526 may be known or specified in the TIM page 510. This period of time may be based, at least in part, upon the number of paged STAs or the Other non-paged STAs (not shown) for which no data is buffered may be configured to enter a doze state for at least this period of time 526. In addition or alternatively, each non-paged STA (not shown) may set the network allocation vector (NAV) for the reserved period of time indicated.

After the TIM page 510 is transmitted by the AP 508, the AP 508 may poll each paged STA 502, 504, and 506 for which it has buffered data (e.g., buffered units) by sending a first control message to each paged STA 502, 504, and 506. Each first control message may indicate a particular paged STA 502, 504, and 506 for which data is planned to be sent. The order of when the AP 508 sends each first control message may be based on the paged STAs order/position in the TIM bitmap or other parameters (e.g., QoS, etc.). As an example, in one exemplary implementation, the AP 508 may send a first control message 512a that indicates that it plans to send buffered data to STA 1 502. All paged STAs 502, 504, and 506 may be awake to receive the first control message 512a. The first control message 512a may indicate an amount of time for which data is planned to be sent to STA 502. STAs 504 and 506, not indicated in the first control message 512a, may sleep and/or set their NAV based on a time period indicated in the first control message 512a. The first control message 512a may be configured as or function similarly to a request to send (RTS) message.

STA 1 502, if awake, may respond to the first control message 512a with a second control message 514a after some frame spacing amount. The second control message 514a may indicate that the STA 1 502 is ready or is planning on receiving the data transmission from the AP 508. In some implementations, the second control message 514a may be configured as or function similarly to a clear to send (CTS) message. In response to receiving the second control message 514a, the AP 508 may send data 516a that is intended for STA 1 502. Thereafter, the STA 1 502 may send, and the AP 508 may receive, an acknowledgment message 518a. After the time period specified in the first control message 512a has ended, the AP 508 may send a subsequent first control message 512b indicating that it is planning on transmitting buffered data to STA 2 504. The subsequent first control message 512b may also indicate a period of time for which it plans to send data to STA 2 504. STAs 502 and 506 may enter into a sleep mode for the period of time indicated in the first control message 512b. In this case, STA 2 504 may for some reason fail to receive the first control message 512b or be unable to respond with a second control message. For example, STA 2 504 may be in a sleep mode for some reason (e.g., for the time period 522) and not receive the first control message 512b. In another case STA 2 504 may be receiving an OBSSS transmission as described above, or be unable to respond. In this case, if the AP 508 does not receive a second control message from STA 2 504, then the AP 508 may not send any data. However, the AP 508 may not send any other first control messages until the time period indicated in the first control message 512b has elapsed as shown by the time period 528, as other STAs 502 and 506 may be configured to sleep during this time.

After the time period 528, the AP 508 may send a subsequent first control message 512c indicating that the AP 508 is planning/requesting to send buffered data to STA 3 506. The first control message 512c may indicate a time period for transmission of data to STA 3 506. In this case, STAs 502 and 504 may be awake to receive the first control message 512c and set their NAV in response and/or sleep for the duration of the time period indicated in the first control message 512c. In other implementations, once a paged STA has received its buffered data from the AP 508, it may sleep for the remainder of the duration 526 and set its NAV accordingly. After receiving the first control message 512c, STA 3 506 may respond with a second control message 514c as described above indicating that it is ready to receive the buffered data. Thereafter, the AP 508 may send data 516c to STA 3 506. The AP 508 may thereafter receive an acknowledgement message 518c from STA 3 506 if the data was received successfully. In some cases, if an acknowledgment message 518c is not received, the AP 508 may be configured to resend a first control message (not shown) in an attempt to resend the data. This process may be repeated for all STAs for which the AP 508 has buffered data to send.

In some cases, STA 2 504 may awaken in time period 524, or be configured to otherwise communicate with AP 508 (e.g., a collision) after missing or being unable to respond to the first control message 512b. In this case, the STA 2 504 may be configured to send a polling message 520 to the AP 508 requesting the data that is buffered for STA 2 504. For example, STA 2 504 may send a PS-POLL to the AP 508 soliciting for transmission of buffered units. In response, the AP 508 may send the data 516b to STA 2 504 and receive an acknowledgment 518b.

In some cases, one of the paged STAs 502, 504, or 506 may be a hidden node. For example, STA 3 506 may be hidden with respect to STAs 502 and 504 but all may see transmissions from AP 508. In this case, as each STA 502, 504, and 506 is waiting for an AP 508 response, waiting for the response is sufficient to protect the STAs 502, 504, and 506 access to the medium.

In some implementations, the paging message, such as a TIM page, may implicitly or explicitly define an ordering of the STAs. For example, the order of when the AP 508 sends each first control message may be based on the paged STAs order/position in the TIM bitmap. In some implementations, the STAs may be configured to selectively at least partially power down during times at which they do not expected data to be transmitted to them. The STAs may be configured to selectively at least partially power down in response to their order/position in the TIM bitmap. For example, the AP 508 may send a TIM bitmap to STA 1 502, STA 2 504 and to STA 3 506 which may indicate that each STA has data buffered for it. Each STA may be configured to determine the order in which it was identified in the TIM bitmap, and to use this information, at least in part, to determine how long it may at least partially power down or sleep. For example, STA 3 506 may be the third STA in the TIM bitmap. STA 3 506 may use this information to sleep for a time period equivalent to how long it may take to transmit data to STA 1 502 and STA 2 504.

In some implementations, data may be sent for a delivery to a single STA individually. For example, the AP 508 may send data 516a that is intended for STA 1 502. This data may be intended only for STA 1 502, and thus may be send for delivery to STA 1 502. This type of system may be referred to as a unicast system, and may comprise a one-to-one connection between a STA, such as STA 1 502, and the AP 508. In some implementations, the data may be multicast data intended for a plurality of STAs. For example, data may be intended for STA 1 502, STA 2 504 and STA 3 506. Multicast data may be intended for each STA, or may be intended for a subset of STAs. It may be desirable to send data to each STA individually, or it may be desirable to send data to a plurality of STAs at the same time. For example, the AP 508 may be configured to multicast data to a plurality of STAs at the same time. It may be advantageous in such an implementation to not have STAs send control messages to the AP 508, as this may result in a larger number of control messages if data is intended to be multicast to a large number of STAs.

Figure 6:
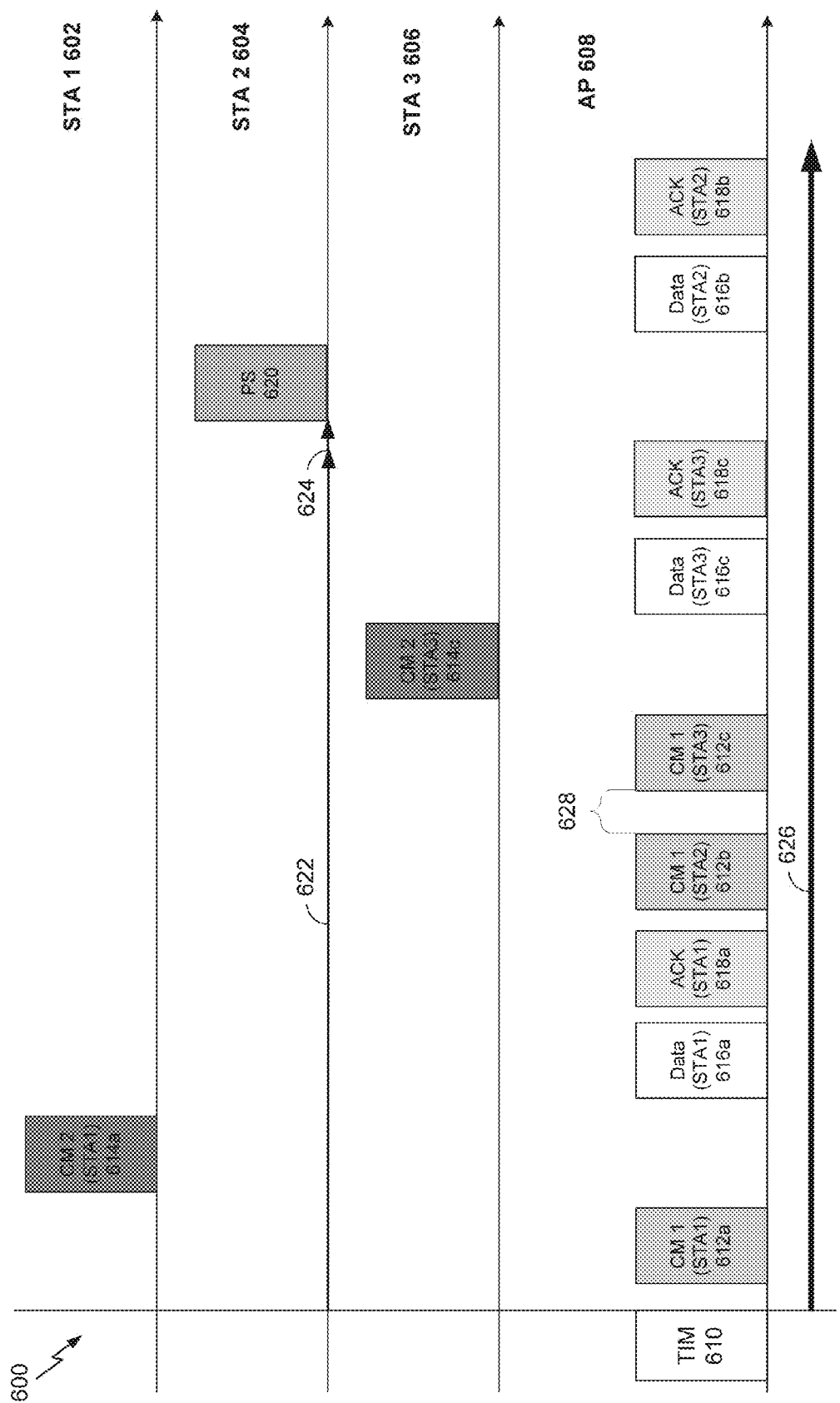
FIG. 6 illustrates another exemplary implementation for access point initiated transmissions after a traffic map indicator page.

FIG. 6 illustrates another exemplary implementation for access point initiated transmissions after a traffic map indicator page. This implementation may function similarly to that shown in FIG. 5, however, as shown in FIG. 6, an AP 608 may send a first control message to a next STA if the current STA did not reply with a second control message after only waiting for the duration of the second control message along with some additional small time period. For example, the additional small time period may be correspond to a distributed inter-frame space (DIFS) duration as defined above.

As shown, an AP 608 may transmit a TIM page 610 that may reserve a time period 626 for transmission of buffered data to paged STAs 602, 604, and 606. As similarly shown in FIG. 5, the AP 608 may thereafter send a first control message 612a indicating that it is requesting to send data to STA 1 602.

Thereafter, STA 1 602 may send a second control message 614a that indicates that it is ready to receive the data from the AP 608. The AP 608 may thereafter send data 616a to STA 1 602 and receive an acknowledgment 618a. Thereafter, AP 608 may transmit a subsequent first control message 612b indicating that it is requesting to send data to STA 2 608. However, as described above, for various reasons (e.g., collision or in a sleep mode), STA 2 608 may not respond with a second control message. In this case, rather than waiting for a planned duration, if the AP 608 does not receive the second control message from STA 2 604, the AP 608 may send another first control message 612c after waiting for the time period in which it may receive a second control message along with some additional defined amount of time such as DIFS shown in part by the time period 628. The first control message 612c would indicate the AP 608 is intending to transmit buffered data for STA 3 606. In this case, the first control messages 612a, 612b, and 612c may not indicate any time period for which data will be sent in the event that no corresponding second control message is received. All paged STAs 602, 604, and 606 may be configured to remain in an awake mode for the duration 626 in case a first control message is sent. However, in some implementations, once a paged STA has received its buffered data, it may enter a sleep mode for the duration 626 after sending an acknowledgment message.

After the first control message 612c is sent, STA 3 606 may send a second control message 614b indicating that it is ready to receive the buffered data. The AP 608 may thereafter send the data 616c and receive an acknowledgement message 618c.

In addition, while STA 2 604 did not respond to its corresponding first control message 612b, STA 2 604 may be configured to be able to thereafter receive buffered data from the AP 608 at some point. As such there may be a reserved or non-reserved time period in which STA 2 604 may send a polling message 620 (e.g., a PS-POLL) to the AP 608 requesting data transmissions. In response, the AP 608 may send the corresponding data 616b and receive an acknowledgement message 618b.

The implementation described above with reference to FIG. 6 may increase the time in which paged STAs may be configured to be in a awake state, however, less of a reserved transmission may be wasted if one of the paged STAs does not respond. As such, this implementation may in some aspects improve medium utilization and reduces access delay for all STAs when at least some of the STAs are not active during TIM paging.

Figure 7:
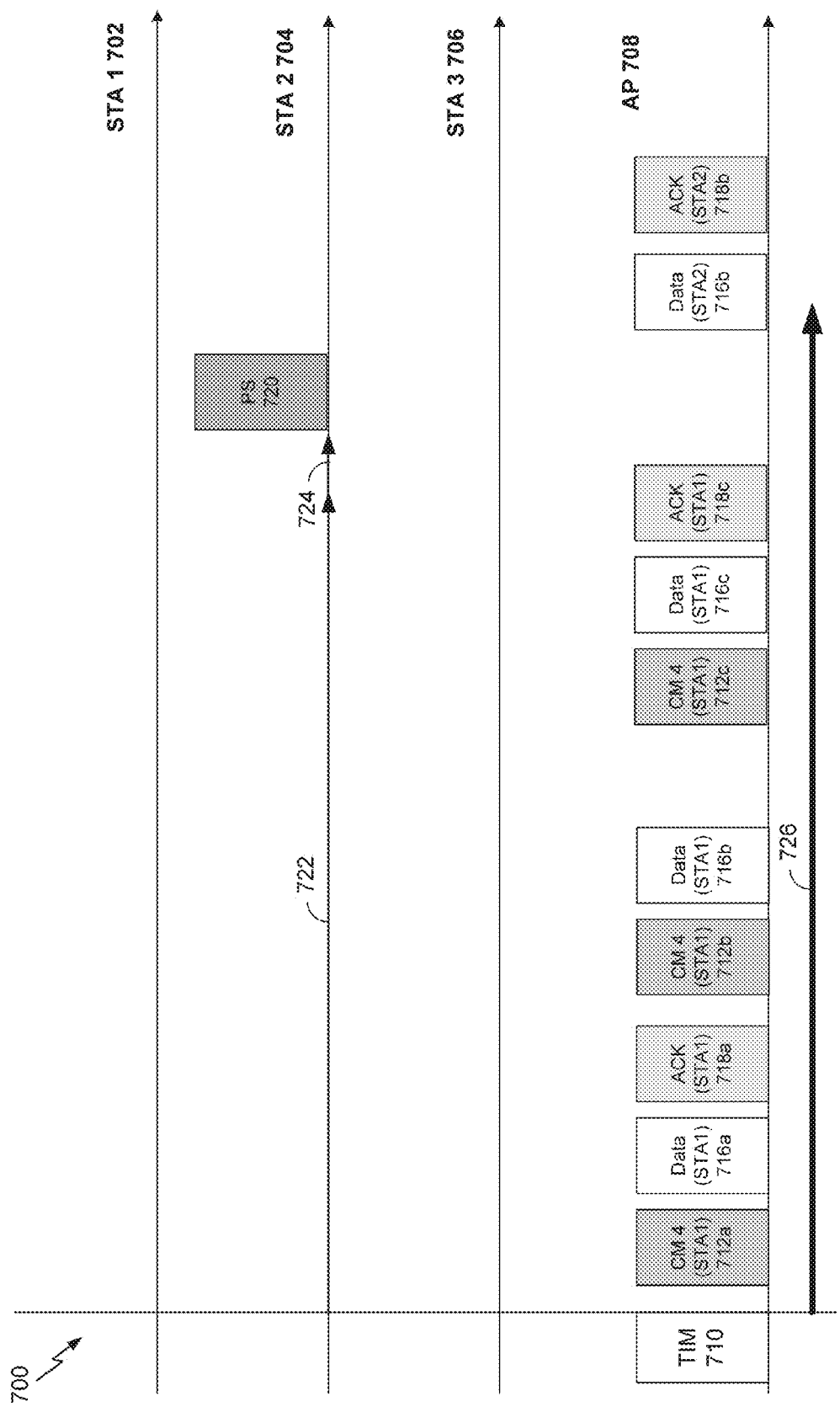
FIG. 7 illustrates another exemplary implementation for access point initiated transmissions after a traffic map indicator page.

FIG. 7 illustrates another implementation for access point initiated transmissions after a traffic map indicator page. In this case, the AP 708 may also reserve a duration 726 for sending buffered data to paged STAs 702, 704, and 706 after a TIM page 710 is transmitted by an AP 708. The duration 726 may be indicated in the TIM page 710 allowing non-paged STAs to go into sleep mode. Thereafter, the AP 708 may be configured to send the buffered data to the paged STAs 702, 704, and 706 without waiting for any responses (e.g., second control messages) from corresponding paged STAs 702, 704, and 706. For example, after sending a TIM page 710, the AP 708 may send a fourth control message 712a that indicates that the AP 708 is planning to send data to STA 1 712a. Thereafter, the AP 708 may send data 716a buffered to the STA 1 702 without waiting for any response and may thereafter receive an acknowledgment message 718a from STA 1 702 if STA 1 702 received the data 716a. This may be repeated for STAs 704 and 706 where the AP 708 may send fourth control signals 712b and 712c and thereafter send data 716b and 716b buffered to the STAs 704 and 706 as shown. In this case, the AP 708 may only receive an acknowledgment message 718c from STA 3 706 if STA 3 706 received the data 716c. The AP 708 may also send a fourth control message and any buffered data to any other paged STAs. A further time period within the duration 726 may also be used for paged STAs that did not receive their respective transmissions. In that case, a paged STA 2 704 may send a polling message 720 (e.g., a PS-POLL) to the AP 708 requesting its buffered data. In response the AP 708 may send data 716b to STA 2 704 and in response may receive an acknowledgment message 718b. The AP 708 may further receive polling messages from other pages STAs. Based on the fourth control message, if a paged STA determines that it is not the recipient of data about to be sent, it can enter a doze state for a NAV duration based on information in the fourth control message. In other implementations, each paged STA may stay awake and watch for its buffered data to be sent which may be further indicated by the fourth control signal. In some implementations, once its data has been received, the paged STA may go into a doze state for the remaining duration 726. In some implementations, the fourth control message may be configured as or function similarly to a clear-to-send to self (CTS-To-Self) message.

Figure 8:
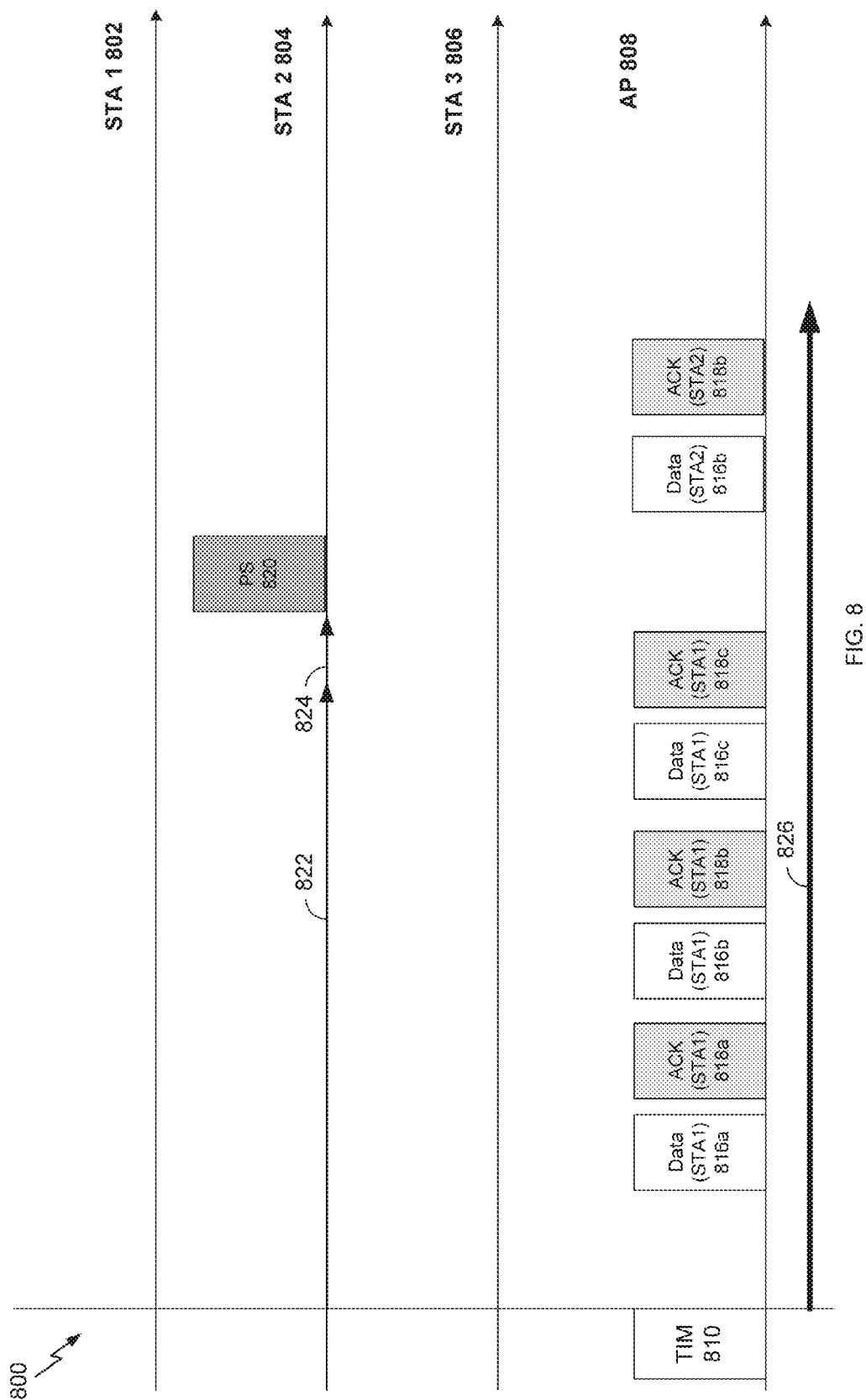
FIG. 8 illustrates another exemplary implementation for access point initiated transmissions after a traffic map indicator page.

FIG. 8 illustrates another exemplary implementation for access point initiated transmissions after a traffic map indicator page. As shown in FIG. 8, as compared to FIG. 7, the fourth control message may not be sent. In this case no control messages are sent indicating that data will be sent to a paged STA. In this case, the AP 808 may send buffered data during a reserved period within the duration 826 to all paged STAs 802, 804, and 806. Each packet of buffered data may be intended for a single STA, in a unicast system as shown in FIG. 8, or for a plurality of STAs, in a multicast system. In this case each paged STA 802, 804, and 806 may stay in an awake state until it sees data intended for that paged STA 802, 804, and 806. In some implementations, after receiving the data, and if there is no more buffered data for the STA, it may enter into a doze state for a remainder of the reserved duration 826. If data was sent to a paged STA 2 804, but the paged STA 2 804 was either asleep or there was a collision, STA 2 804 may thereafter sending a polling message 820 to request paged data during a reserved (e.g., guard) or non-reserved time interval. The AP 808 may then resend the data 816b and may receive an acknowledgment message 818b.

It should be appreciated that each device may operate according to several modes that may correspond to each of the implementations or combinations thereof described in FIGS. 5-8. As such, depending on the mode, the AP and STAs may be configured to operate differently, where the mode be selected based on various operating conditions and parameters.

Figure 9:
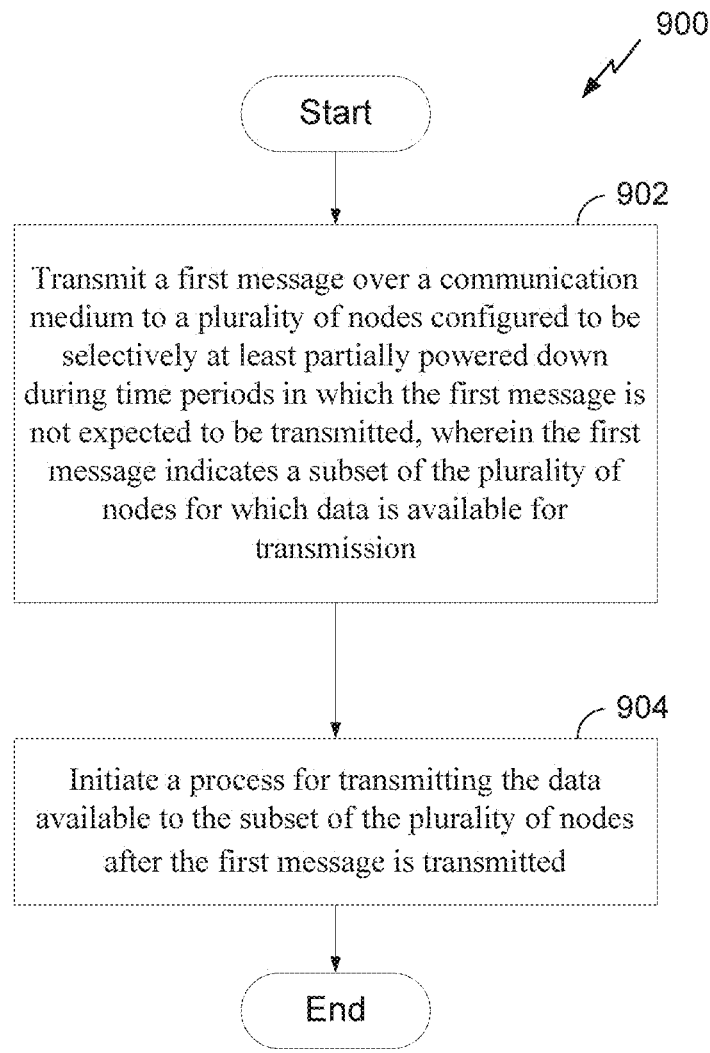
FIG. 9 is a flowchart of an exemplary method for access point initiated transmissions after a traffic map indicator page.

FIG. 9 is a flowchart of an exemplary method for access point initiated transmissions after a traffic map indicator page. At block 902, the method may include transmitting a first message over a communication medium to a plurality of nodes configured to be selectively at least partially powered down during time periods in which the first message is not expected to be transmitted. The first message indicates a subset of the plurality of nodes for which data is available for transmission. The first message may correspond to a TIM page. In block 904, the method includes initiating a process for transmitting the data available to the subset of the plurality of nodes after the first message is transmitted. The process may correspond to any implementation described above with reference to FIGS. 5-8 or any combination thereof. The method 900 may be implemented in an access point.

Figure 10:
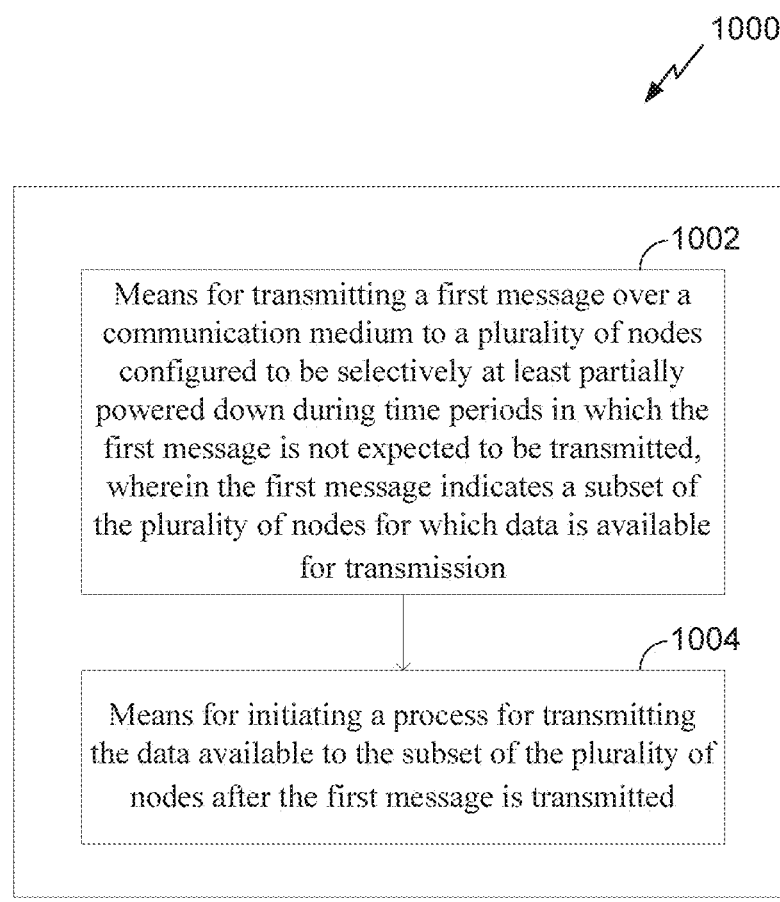
FIG. 10 is a functional block diagram of an exemplary wireless device that may be employed within the wireless communication system of FIG. 1.

FIG. 10 is a functional block diagram of an exemplary wireless device 1000 that may be employed within the wireless communication system 100. The device 1000 includes means 1002 for transmitting a first message over a communication medium to a plurality of nodes configured to be selectively at least partially powered down during time periods in which the first message is not expected to be transmitted. The first message indicates a subset of the plurality of nodes for which data is available for transmission. The first message may correspond to a TIM page message. In one implementation, the means for transmitting a first message may be configured to perform one or more of the functions discussed above with reference to block 902. The device 1000 may further includes means 1004 for initiating a process for transmitting the data available to the subset of the plurality of nodes after the first message is transmitted. The means for initiating a process 1004 may be configured to perform one or more of the functions discussed above with reference to block 902. The means 1002 may include a transmitter. The means 1004 may include a controller.

Figure 11:
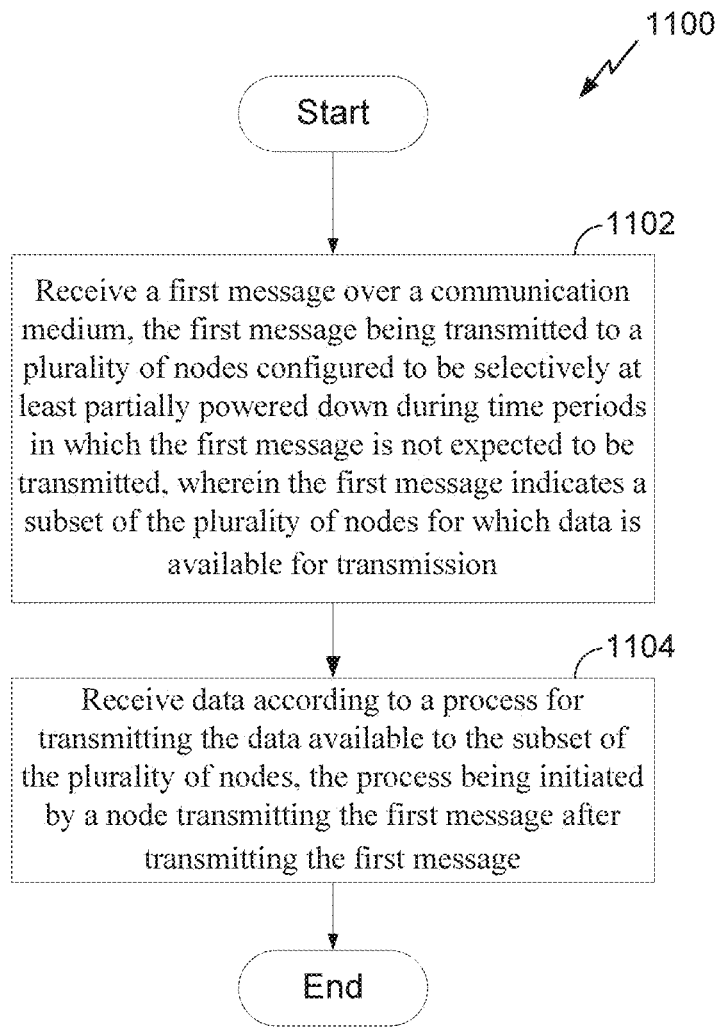
FIG. 11 is a flowchart of an exemplary method for receiving access point initiated transmissions after a traffic map indicator page.

FIG. 11 is a flowchart of an exemplary method for receiving access point initiated transmissions after a traffic map indicator page. In block 1102, the method may include receiving a first message over a communication medium. The first message is transmitted to a plurality of nodes configured to be selectively at least partially powered down during time periods in which the first message is not expected to be transmitted. The first message indicates a subset of the plurality of nodes for which data is available for transmission. In block 1104, the method further includes receiving data according to a process for transmitting the data available to the subset of the plurality of nodes. The process is initiated by a node transmitting the first message after transmitting the first message.

Figure 12:
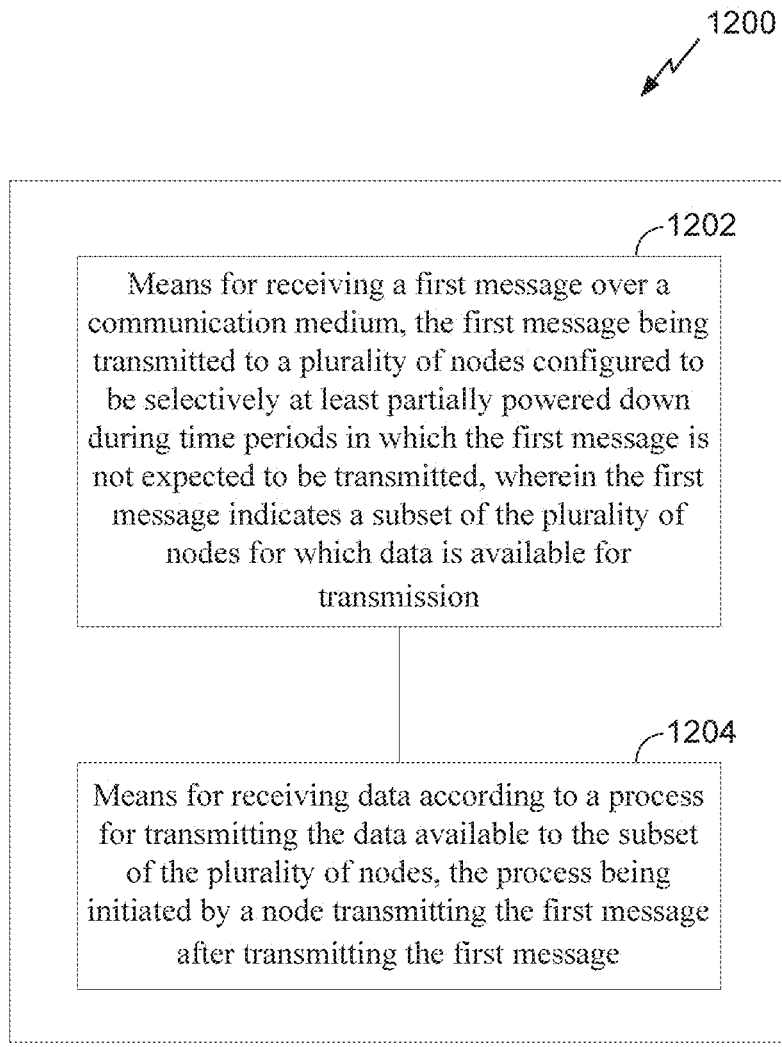
FIG. 12 is another functional block diagram of an exemplary wireless device that may be employed within the wireless communication system of FIG. 1.

FIG. 12 is a functional block diagram of an exemplary wireless device 1200 that may be employed within the wireless communication system 100. The device 1200 includes means 1202 for receiving a first message over a communication medium. The first message is transmitted to a plurality of nodes configured to be selectively at least partially powered down during time periods in which the first message is not expected to be transmitted. The first message indicates a subset of the plurality of nodes for which data is available for transmission. In an embodiment, means 1202 for receiving the first message may be configured to perform one or more of the functions discussed above with respect to block 1102. The device 1200 further includes means 1204 for receiving data according to a process for transmitting the data available to the subset of the plurality of nodes, the process being initiated by a node transmitting the first message after transmitting the first message. The first message may correspond to a TIM page message. In an embodiment, means 1204 for receiving data may be configured to perform one or more of the functions discussed above with respect to block 1104. The means 1202 and 1204 may include a receiver.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, the apparatus comprising:
    a transmitter configured to transmit a first message over a communication medium to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
    a controller configured to initiate a process for transmitting the data available to the subset of the plurality of nodes after the first message is transmitted, wherein the process comprises:
        transmitting a first control message to a first node of the subset of the plurality of nodes;
        transmitting data for the first node to the first node if a second control message is received from the first node within a first duration after the first control message is sent to the first node; and
        transmitting the first control message to a second node of the subset if the second control message is not received within the first duration.

2. The apparatus of claim 1, wherein the plurality of nodes are configured to be selectively at least partially powered down during time periods in which the first message is not expected to be transmitted, wherein the controller is further configured to reserve a second time period for each node of the subset of the plurality of nodes within the first time period for transmitting unicast data to each node, and wherein the first control message is transmitted within each respective second time period and indicates the apparatus will transmit unicast data to the node to which the first control message is transmitted.

3. The apparatus of claim 2, wherein the controller is further configured to receive a third control message from at least one node of the subset of the plurality of nodes during the respective second time period, the third control message requesting data to be sent to the at least one node.

4. The apparatus of claim 3, wherein the third control message comprises a power save polling (PS-POLL) message.

5. The apparatus of claim 2, wherein the transmitter is further configured to transmit data to each of the subset of nodes during the first time period.

6. The apparatus of claim 5, further comprising a receiver configured to receive a third control message requesting data from a node of the subset after data is transmitted to each of the subset of nodes.

7. The apparatus of claim 1, wherein nodes not included in the subset of the plurality of nodes are configured be at least partially powered down during the first time period.

8. The apparatus of claim 7, wherein the nodes not included in the subset of the plurality of nodes are configured to set a network allocation vector (NAV) for the first time period.

9. The apparatus of claim 1, wherein the transmitter is further configured to transmit node data to a node of the subset of the plurality of nodes within a corresponding second time period for that node if the second control message is received from the node during the corresponding second time period.

10. The apparatus of claim 1, wherein each node is configured to be selectively at least partially powered down for a third time period within a corresponding second time period if the first control message transmitted within the corresponding second time period indicates data is scheduled to be transmitted to another node of the subset.

11. The apparatus of claim 1, wherein the first duration corresponds to a distributed inter-frame space (DIFS).

12. The apparatus of claim 1, wherein a first node of the subset is configured to selectively be at least partially powered down during a second time period of a second node.

13. The apparatus of claim 1, wherein the transmitter is further configured to transmit a first control message to the subset of nodes, the first control message indicating a first node of the subset of the plurality of nodes.

14. The apparatus of claim 13, wherein the transmitter is further configured to transmit first node data to the first node via the transmitter if the second control message is received from the first node.

15. The apparatus of claim 13, wherein the transmitter is further configured to transmit first node data to the first node if the second control message is not received from the first node.

16. The apparatus of claim 13, wherein a second node is configured to be selectively at least partially powered down for a first period of time after receiving the first control message.

17. The apparatus of claim 16, wherein the second node is configured to set a network allocation vector (NAV) for the first time period.

18. The apparatus of claim 1, wherein the first message comprises a traffic indication map (TIM) paging message.

19. The apparatus of claim 1, wherein the transmitter is configured to transmit the first message according to an IEEE 802.11ah protocol.

20. A method for wireless communication, the method comprising:
- transmitting a first message over a communication medium to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
- initiating a process for transmitting the data available to the subset of the plurality of nodes after the first message is transmitted, wherein the process comprises:
  - transmitting a first control message to a first node of the subset of the plurality of nodes;
  - transmitting data for the first node to the first node if a second control message is received from the first node within a first duration after the first control message is sent to the first node; and
  - transmitting the first control message to a second node of the subset if the second control message is not received within the first duration.

21. An apparatus for wireless communication, the apparatus comprising:
- means for transmitting a first message over a communication medium to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
- means for initiating a process for transmitting the data available to the subset of the plurality of nodes after the first message is transmitted, wherein the process comprises:
  - means for transmitting a first control message to a first node of the subset of the plurality of nodes;
  - means for transmitting data for the first node to the first node if a second control message is received from the first node within a first duration after the first control message is sent to the first node; and
  - means for transmitting the first control message to a second node of the subset if the second control message is not received within the first duration.

22. A computer program product, comprising:
a non-transitory computer readable medium comprising:
- code for transmitting a first message over a communication medium to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
- code for initiating a process for transmitting the data available to the subset of the plurality of nodes after the first message is transmitted, wherein the code for initiating the process comprises:
  - code for transmitting a first control message to a first node of the subset of the plurality of nodes;
  - code for transmitting data for the first node to the first node if a second control message is received from the first node within a first duration after the first control message is sent to the first node; and
  - code for transmitting the first control message to a second node of the subset if the second control message is not received within the first duration.

23. A method for wireless communication, the method comprising:
- receiving, via a wireless device, a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
- receiving data according to a process for transmitting the data available to the subset of the plurality of nodes after the first message is transmitted, wherein the process for transmitting further comprises:
  - transmitting a first control message to a first node of the subset of the plurality of nodes;
  - transmitting data for the first node to the first node if a second control message is received from the first node within a first duration after the first control message is sent to the first node; and
  - transmitting the first control message to a second node of the subset if the second control message is not received within the first duration.

24. An apparatus for wireless communication, the apparatus comprising:
- means for receiving a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and means for receiving data according to a process for transmitting the data available to the subset of the plurality of nodes after the first message is transmitted, wherein the process for transmitting further comprises:
  means transmitting a first control message to a first node of the subset of the plurality of nodes
  transmitting data for the first node to the first node if a second control message is received from the first node within a first duration after the first control message is sent to the first node; and
  transmitting the first control message to a second node of the subset if the second control message is not received within the first duration.

25. A computer program product, comprising:
a non-transitory computer readable medium comprising:
  code for receiving, via a wireless device, a first message over a communication medium, the first message being transmitted to a plurality of nodes, wherein the first message indicates a subset of the plurality of nodes for which data is available for transmission, the first message further indicating a time at which data will be transmitted to nodes of the subset of the plurality of nodes and indicating a first time period in which the communication medium is reserved for transmission to the subset of the plurality of nodes; and
  code for receiving data according to code for a process for transmitting the data available to the subset of the plurality of nodes after the first message is transmitted, wherein the code for the process for transmitting further comprises:
  code for transmitting a first control message to a first node of the subset of the plurality of nodes transmitting data for the first node to the first node if a second control message is received from the first node within a first duration after the first control message is sent to the first node; and
  transmitting the first control message to a second node of the subset if the second control message is not received within the first duration.

* * * * *